(12) United States Patent
Pappalardo et al.

(10) Patent No.: US 7,586,943 B2
(45) Date of Patent: Sep. 8, 2009

(54) METHOD AND DEVICE FOR TRANSMITTING DATA ON A SINGLE LINE, IN PARTICULAR FOR TRANSMITTING DATA ON A BUS WITH MINIMIZATION OF THE BUS SWITCHING ACTIVITY, AND CORRESPONDING COMPUTER PRODUCT

(75) Inventors: Francesco Pappalardo, Paterno' (IT); Giuseppe Visalli, Messina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 789 days.

(21) Appl. No.: 10/757,772

(22) Filed: Jan. 14, 2004

(65) Prior Publication Data

US 2004/0218629 A1 Nov. 4, 2004

(30) Foreign Application Priority Data

Jan. 14, 2003 (EP) ................... 03425013

(51) Int. Cl.
*H04J 3/16* (2006.01)
(52) U.S. Cl. .................. 370/466; 370/476
(58) Field of Classification Search .......... 370/476
See application file for complete search history.

(56) References Cited

U.S. PATENT DOCUMENTS

| | | | | |
|---|---|---|---|---|
| 4,667,337 A | | 5/1987 | Fletcher | 377/41 |
| 4,933,897 A | * | 6/1990 | Shankar et al. | 713/502 |
| 5,436,928 A | * | 7/1995 | Fukuawa et al. | 375/232 |
| 5,572,736 A | * | 11/1996 | Curran | 713/320 |
| 5,586,125 A | * | 12/1996 | Warner | 714/738 |
| 5,680,300 A | * | 10/1997 | Szepesi et al. | 363/59 |
| 5,825,644 A | * | 10/1998 | Yeap | 700/12 |
| 6,933,863 B2 | | 8/2005 | Visalli et al. | |
| 2002/0156953 A1 | * | 10/2002 | Beiley et al. | 710/105 |

(Continued)

FOREIGN PATENT DOCUMENTS

| | | |
|---|---|---|
| EP | 0 886 220 A2 | 12/1998 |
| JP | 9-69075 | 11/1997 |

OTHER PUBLICATIONS

The authoritative dictionary of IEEE standards terms, IEEE press, seventh edition, p. 437.*

(Continued)

*Primary Examiner*—Hassan Kizou
*Assistant Examiner*—Hooman Houshmand
(74) *Attorney, Agent, or Firm*—Lisa K. Jorgenson; E. Russell Tarleton; Seed IP Law Group PLLC (57) ABSTRACT

Described herein is a method for transmitting data on a bus with minimization of the bus switching activity, comprising the steps of converting the datum to be transmitted from its own original format to a transmission format that minimizes the switching activity on the bus, said conversion consisting in swapping the position of one or more bits of the datum to be transmitted, the swapping being performable according to a plurality of different variants, each of which is identified by a respective sorting pattern, and selecting, between the various sorting patterns, an optimal sorting pattern that minimizes the bus switching activity upon transmission on the bus of the datum generated using said optimal sorting pattern.

24 Claims, 4 Drawing Sheets

U.S. PATENT DOCUMENTS

2002/0196327 A1* 12/2002 Rui et al. ............... 348/14.11
2003/0212441 A1* 11/2003 Starkweather et al. ........ 607/60

OTHER PUBLICATIONS

De-Sheng Chen Sarrafzadeh, M. Yeap, G.K.H., State encoding of finite state machines for low power design, Apr. 28, 1995, IEEE, 1995 IEEE International Symposium on Circuits and Systems, vol. 3, pp. 2309-2312.*

Tuagi, A., Entropic bounds on FSM switching, Dec. 1997, IEEE, IEEE Transactions on Very Large Scale Integration (VLSI) Systems, vol. 5, Issue: 4, pp. 456-464.*

Monteiro, J.C. Oliveira, A.L., Implicit FSM decomposition applied to low-power design, Oct. 2002, IEEE Transactions on Very Large Scale Integration (VLSI) Systems, vol. 10, Issue: 5, pp. 560-565.*

Lemberski, I. Koegst, M. Cotofana, S. Juurlink, B., FSM non-minimal state encoding for low power, May 12, 2002, IEEE, 23rd International Conference on Microelectronics, vol. 2, pp. 605-608.*

Pappalardo, F. et al., "Bus Switching Architecture," *STMicroelectronics*.

Abstract of European Patent Application No. 03425013.4 filed Jan. 14, 2003.

Benini et al., "Architectures and Synthesis Algorithms for Power-Efficient Bus Interfaces," IEEE Transactions on CAD, vol. 19, No. 9, Sep. 2000, pp. 969-980.

Kretzschmar et al., "Adaptive Bus Encoding Technique for Switching Activity Reduced Data Transfer over Wide System Buses," International Workshop—Power and Timing Modelling, Optimization and Simulation (PATMOS2000) Goettingen (D), Sep. 13-15, 2000 (English Abstract Only).

Siegmund et al., "Adaptive Partial Businvert Encoding for Power Efficient Data Transfer Over Wide System Buses," Proceedings on the 13th Symposium on Integrated Circuits and Systems Design, Sep. 18-24, 2000, pp. 371-376.

* cited by examiner

METHOD AND DEVICE FOR TRANSMITTING DATA ON A SINGLE LINE, IN PARTICULAR FOR TRANSMITTING DATA ON A BUS WITH MINIMIZATION OF THE BUS SWITCHING ACTIVITY, AND CORRESPONDING COMPUTER PRODUCT

FIELD OF THE INVENTION

The present invention relates to a method and a device for transmitting data on a single line, and to a corresponding computer product.

In particular, the present invention finds advantageous but non-exclusive application for transmitting data on a bus with minimization of the bus switching activity, to which the following description will refer explicitly, without this implying any loss of generality.

BACKGROUND OF THE INVENTION

As is known, the switching activity on a wide bus or a narrow bus is responsible for a non-negligible absorption of electrical energy by the bus.

A bus can in fact be considered as a set of transmission lines, to each of which there is associated a parasitic capacitance, which, at each switching of the corresponding line, i.e., at each transition 0→1 or 1→0 of the signals travelling thereon, must be charged or discharged, with consequent absorption of electrical energy.

Reduction of bus switching activity is hence an issue to which there has been dedicated, and there continues to be dedicated, an intense and extensive research activity aimed at reducing the absorption of electrical energy and, more in general, at preventing the adverse phenomena linked to the capacitive behaviour of the bus.

A technique that is widely used for reducing bus switching activity consists in encoding the data stream to be transmitted on the bus using an invertible encoding law, i.e., one that can be decoded.

The encoding technique known as "bus-inverted" technique is currently the one most widely used for reducing bus switching activity, both on account of its ease of implementation, and on account of the good performance achieved, especially where the total number of lines of the bus is small. This encoding further proves to be usable also on asynchronous buses.

For a more detailed review of the subject, the following works may be usefully consulted: *Adaptive Bus Encoding Technique for Switching Activity Reduced Data Transfer over Wide System Buses*, Claudia Kretzschmar, Robert Siegmund and Dietmar Müller, International Workshop—Power and Timing Modelling, Optimization and Simulation (PATMOS2000) Goettingen (D), Sep. 13-15, 2000; and *Architectures and Synthesis Algorithms for Power-Efficient Bus Interfaces*, I. Benini, A. Macii, E. Macii, M. Poncino, R. Scarsi, IEEE Transactions on CAD, Vol. 19, No. 9, September, 2000, pp. 969-980.

BRIEF SUMMARY OF THE INVENTION

The improved solution proposed by the present applicant for reducing bus switching activity includes the transmission of the sorting pattern $P_t$ used by a swap operator at the transmission end so that the data transmitted may be recovered properly at the reception end, the transmission being made using additional lines the additional switching activity of which degrades the total performance of the system.

The aim of the present invention is thus to provide an improved solution that will enable a significant reduction in the number of additional lines necessary for transmitting the sorting pattern.

The above aim is achieved by the present invention in so far as it relates to a method and a device for transmitting data on a single line, to a method and to a device for transmitting data on a bus with minimization of the bus switching activity, and to the corresponding computer products, as defined in the claims.

Basically, the idea underlying the present invention is to use two functionally identical finite state machines, one at the transmission end and one at the reception end, in which each finite state machine has a number of internal states equal to the number of possible sorting patterns and in which each internal state is uniquely associated to a respective sorting pattern.

Finite state machines at the transmission end and at the reception end receive the same clock signal so as to be synchronized with one another, i.e., at each time their internal states coincide. For this reason, when the internal state of the finite state machine at the transmission end coincides with the sorting pattern to be transmitted, this generates a synchronization signal that is transmitted to the finite state machine at the reception end using a single transmission line. The finite state machine at the reception end thus determines the sorting pattern associated to its internal state at the moment of reception of the synchronization signal, a sorting pattern which, thanks to the fact that the internal states of the finite state machines are the same at each instant of time, is exactly identical to the one transmitted.

The present invention thus makes it possible to reduce to one the additional transmission lines necessary for transmitting the sorting pattern, with consequent drastic reduction in the additional switching activity due precisely to the additional lines.

According to a further aspect of the present invention, the additional switching activity can be further reduced by causing the coincidence between the internal state of the finite state machine at the transmission end and the sorting pattern to be transmitted to be signalled to the finite state machine at the reception end by simply complementing the synchronization signal, which involves a single switching on the bus (single switching edge), instead of by generating a synchronization pulse, which involves two switchings on the bus (double switching edge of the pulse, a leading one and a trailing one). Even though it is not optimal, the latter technique could, however, be in any case used.

BRIEF DESCRIPTION OF THE DRAWINGS

For a better understanding of the present invention there is now described a preferred embodiment, provided purely by way of non-limiting example and with reference to the attached drawings, in which.

DETAILED DESCRIPTION

Figure 1:
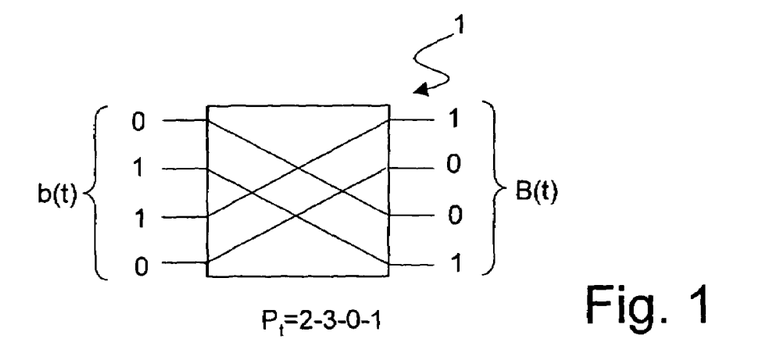
FIG. 1 illustrates, in general terms, the operating criteria of a swap operator that can be used in the framework of the invention.

One solution is based upon the use of a swap operator operating according to the criteria illustrated in FIG. 1, in which b(t) designates the input data stream of the swap operator, designated by 1, at the time t, B(t) designates the corresponding output data stream of the swap operator 1 at the same time, and $P_t$ designates the sorting pattern implemented by the swap operator 1. Furthermore, if the input data and the output data of the swap operator are represented by N=2n bits, the sorting pattern $P_t$ is represented by N digits, each consisting of n bits, and will be able to assume N! (N factorial) distinct values.

See for example an improved solution for reducing the bus switching activity is proposed in the European patent application No. 02425456.7, filed on Jul. 10, 2002 by the present applicant and, broadly speaking, substantially consisting in switching the input lines of the bus using a sorting pattern that is chosen so as to minimize the switching activity between the current transmission and the previous transmission.

In the specific case represented in FIG. 1, the input datum at time t is b(t)=0110, whilst the output datum at the same time is B(t)=1001.

Assuming then that to each of the bits of the input and output data there is assigned a numbering corresponding to its position, for example 0, 1, 2, 3 proceeding from the top down, in the example represented in FIG. 1, the sorting pattern is therefore $P_t=\{2\text{-}3\text{-}0\text{-}1\}$, the meaning of which is as follows:

the input bit having position 0 becomes the output bit having position 2;
the input bit having position 1 becomes the output bit having position 3;
the input bit having position 2 becomes the output bit having position 0; and
the input bit having position 3 becomes the output bit having position 1.

In more general terms, it may be said that the swap operator can be mathematically modelled via a swap operator S that sets in relation the input datum, the output datum and the sorting pattern, i.e., an operator for which there applies a relation of the type:

$$B(t)=S(b(t),P_t)$$

The swap operator in general admits of an inverse function $S^{-1}$, whereby:

$$b(t)=S^{-1}(B(t),P_t)$$

The direct and inverse swapping operations may be performed using the same function by applying two different sorting patterns connected by the bi-unique relation:

$$b(t)=S^{-1}(B(t),P_t)=S(B(t),P_t^{-1})$$

From what has just been said, it is possible to understand that, with a given input data stream b(t), it is possible to make N! attempts to measure the switching activity between the previous output data B(t−1) and a given current attempt function $\tilde{B}(t)$ calculated by varying an attempt sorting pattern $\tilde{p}$.

For example, the measurement of the switching activity SA can be expressed by resorting to the Hamming distance applied to the function of exclusive OR between B(t−1) and $\tilde{B}(t)$, namely:

$$\min_{\tilde{p}} SA(\tilde{p}) = \min_{\tilde{p}} H[B(t-1) \oplus \tilde{B}(t)] \Rightarrow P_t$$

When the attempt sorting pattern p becomes equal to the optimal one, i.e., $P_t$, then we have B(t)=$\tilde{B}$(t).

There are various degrees of freedom for the choice of $\tilde{B}$(t), but this depends specifically upon the current input datum b(t) and upon the current sorting pattern $P_t$.

In what follows some examples of attempt functions are presented that are suitable for being used in a particularly advantageous way both on account of their simple form and on account of the possibility of enabling a easy decoding:

$$\tilde{B}(t)=S(b(t),\tilde{p}) \qquad \text{I.}$$

$$\tilde{B}(t)=S(b(t),\tilde{p})\oplus S^{-1}(b(t-1),\tilde{p}) \qquad \text{II.}$$

$$\tilde{B}(t)=S(b(t),\tilde{p})\oplus S^{-1}(B(t-1),\tilde{p}) \qquad \text{III.}$$

The tests conducted by the present applicant, simulating the transmission, on a 32-bit bus, of files of a different type (Latex, Spice, GCC, JPEG, MP3 and AVI) show—with reference to a cluster depth M equal to four and with the use of all 24 possible sorting patterns—a reduction in the switching activity SA by adopting the bus inverted technique and considering also a switching activity on the additional lines used for transmission of the sorting pattern $P_t$, of between 0% and 10.64%. In particular, using Function I, the reduction was between 2.74% and 14.56%; using Function II the reduction found was between 3.3% and 17.72%; and using Function III the reduction was between 15.5% and 23.16%.

It is also interesting to note how an improvement in terms of performance may depend upon the width of the bus. For example, comparing the results obtainable using the bus inverted technique with the results obtainable using Function III considered previously for a Spice file, it may be noted that for a bus having 8 lines the two solutions yield results that are practically equivalent. On buses having 32 and 40 lines the performance that can be achieved using Function III leads to a reduction in the switching activity that is practically twice what can be achieved using the bus inverted technique. In the case of a 64-line bus, Function III seen previously leads to a reduction in the switching activity that is almost three times what can be achieved using the bus inverted technique.

Returning again to the transmission of the output bits of the swap operator on the bus, the transmitter responsible for carrying out said function generates the output after making N! attempts, using the sorting pattern $P_t$ that has given rise to the minimum switching activity SA.

However, if N is a correspondingly large number, the number of attempts required becomes rather high, and this forces the transmitter in question to operate at a speed much greater than that of the bus, i.e., with a clock frequency much higher than the clock frequency at which the data are sent onto the bus.

It follows that this technique, which in itself is effective, can be used in an altogether satisfactory way only with buses having a rather slow clock.

In order to overcome this drawback it is possible to operate with a subset of the sorting patterns allowed and to use a parallel processing, which increases the area of silicon occupied by the transmitter. Furthermore, if the value of N is high, the number of bits that represent the sorting pattern $P_t$ increases exponentially.

If a subset of the allowed sorting patterns chosen by analysing the mean traffic and selecting the best sorting pattern is considered, there is obtained a reduction in the number of additional lines. At the same time, the fact of reducing the sorting patterns allowed with respect to an ideal solution means that there is obtained a reduction in the coverage, with a consequent degradation of the performance in overall terms.

More specifically, the results of the simulations carried out by the present applicant show that the gain in terms of reduction in the switching activity SA cannot be appreciable, should a subset of sorting patterns be chosen without following a precise criterion.

If the choice of the allowed sorting patterns is governed via test files and the recurrences of the best sorting patterns starting from the original algorithm are measured, different results are obtained.

For example, with N=32 and M=4, comparing the performance of sorting patterns of 4, 8, 16, and 24 bits (complete) on a Spice file, it may be noted that the best performance is obtained using 16 sorting patterns.

With reference to the results seen above, it is again possible to note that the data referred to previously with reference to Functions I, II and III can be further improved with reference to certain files using the sixteen best sorting patterns via analysis of the mean traffic. This is found to be true even though for other files the fact of resorting to this solution does not lead to an improvement, but rather to a slight deterioration in performance with respect to the performance cited previously.

In any case, the foregoing applies even though Function III continues to yield by far the best performance in terms of reduction of switching activity.

As has been said previously, when the bus is formed by a number of lines N that is relatively large, the number of attempts made for determining the optimal sorting pattern before making the transmission becomes rather high, which forces the transmitter to operate at a speed much greater than that of the bus, i.e., with a clock frequency that is much higher than the clock frequency with which the bus input data vary.

In order to overcome this drawback, it is also possible to divide the bus into a subset of narrower buses each formed by M lines, with M much smaller than N. The narrower buses are known as "clusters", and M is the cluster depth. For the various clusters the same sorting pattern is used, which is selected so as to minimize the total switching activity on the wide bus, i.e., the switching activity on all the N/M clusters.

Of course, in order to be able to recover the data properly at the reception end, the sorting pattern $P_t$ used by the swap operator at the transmission end must necessarily be transmitted to the reception end using additional lines.

Assuming that the cluster depth M is a power of two, the number of lines necessary for transmitting a sorting pattern of a cluster with depth M are $M \cdot \log_2 M$. Such a large number of lines is in actual fact redundant in so far as it is necessary to represent just M! different states. During transmission, the sorting patterns can thus be compressed on the number of lines strictly necessary for representing M! different states. It follows that the number of additional lines necessary for said purpose is given by the first integer greater than $\log_2 M!$.

Consequently, in transmission a compression module must be provided that carries out compression of the bits of the sorting pattern $P_t$ and in reception a decompression module must be provided that carries out decompression of the bits transmitted for reconstructing the sorting pattern $P_t$.

The modules that implement the compression and decompression functions are configurable as simple combinatorial logic networks which are designed to implement a truth table and which do not include flip-flops.

Figure 2:
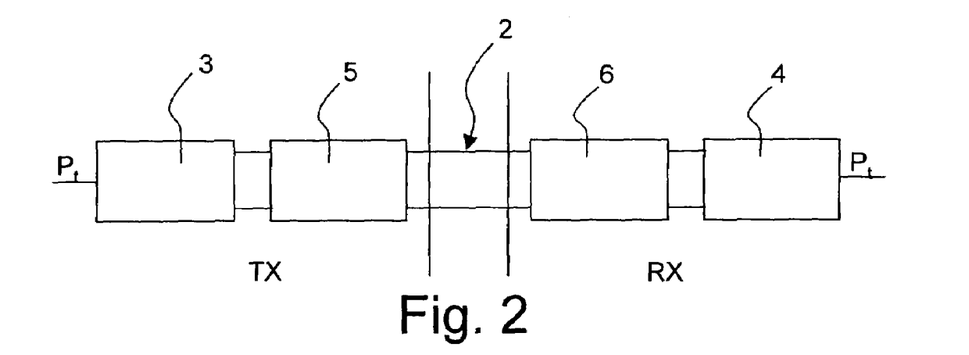
FIG. 2 is a block diagram that illustrates the transmission of the information on a bus.

FIG. 2 is a schematic illustration, in the form of a functional block diagram, of the logic used for transmitting and receiving the information corresponding to the sorting pattern transmitted on specially provided additional lines of the bus.

In the diagram of FIG. 2, TX and RX designate respectively, the transmission end and the reception end with respect to the bus, which is designated by 2. The reference number 3 designates the compression module which, at the transmission end, compresses the bits of the sorting pattern on $M \cdot \log_2 M$ bits necessary for transmitting said sorting pattern on the number of lines identified by the integer greater than $\log_2 M!$; the reference number 4 designates the decompression module which, at the reception end, decompresses the $M \cdot \log_2 M$ bits transmitted for reconstructing the sorting pattern $P_t$; and the numbers 5 and 6 designate the compression module and, respectively, the decompression module that perform the compression and decompression functions, respectively in the transmission step and in the reception step with respect to the additional lines of the bus 2.

For transmitting the sorting pattern on the additional lines, it is possible to use advantageously the above-mentioned bus inverted technique, which, where the additional lines number just a few, enables a reduction in the switching activity to be obtained close to 60-70% as compared to the total switching activity.

Figure 3:
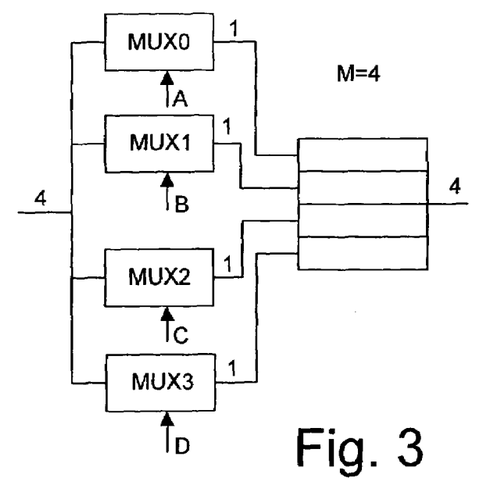
FIGS. 3 and 4 are block diagrams that illustrate two implementations of the swap operator of FIG. 1.

The diagram of FIG. 3 illustrates a simple implementation of the swap operator 1 of FIG. 1. The implementation illustrated is designed to operate on just one cluster and is made up of M multiplexers (where in the example illustrated here they number four). The multiplexers receive the input data stream b(t) and implement the switching driven by the sorting pattern so as to give rise to the data stream B(t).

Figure 4:
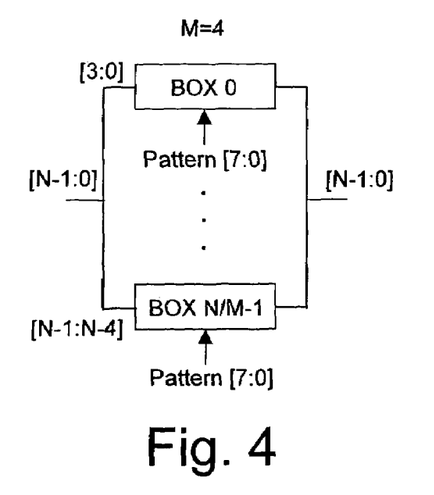

The diagram of FIG. 4 illustrates, instead, how it is possible to provide a structure capable of operating on a bus with a number of lines equal to M, where it is assumed that M is quite a high number. In this case, the solution described envisages use of K swap operators of the same type as the one described previously, where K=(N/M)−1. In other words, this solution corresponds to the fact of having divided ideally a wide bus with M lines into N narrow buses, each of which is formed by M/N lines. This operating mode means that the attempts at selection of the optimal sorting pattern to be implemented on the various narrow buses are much less numerous than the ones that should be implemented on the wide bus. As has already been said, it is possible, in particular, to cause a single sorting pattern to be finally used for all the narrow buses chosen as the sorting pattern that minimizes the total bus switching activity.

Furthermore, as described previously, the direct and inverse swapping operation can be performed using the same swap operator but with different input sorting patterns. If $P_t$ represents the direct swapping operation, there always exists a sorting pattern $P_x = P_t^{-1}$ that performs the inverse swapping function:

$$S(b(t),P_t) = S^{-1}(b(t),P_t^{-1}) = S^{-1}(b(t),P_x), \forall b(t)$$

$P_x$ and $P_t$ are linked by a bi-unique relation, so that it is possible to use a combinatorial network to obtain $P_x$ starting from $P_t$.

For example the table presented below gives different values of $P_t$ and $P_x$ when M=4, in order to clarify how the combinatorial network may be created.

| $P_t$ | $P_x$ |
|---|---|
| 1-2-3-0 | 3-0-1-2 |
| 1-0-2-3 | 1-0-2-3 |
| 2-1-3-0 | 3-1-0-2 |
| 0-1-3-2 | 0-1-3-2 |
| 2-1-0-3 | 2-1-0-3 |
| 1-3-0-2 | 2-0-3-1 |

A module of this sort, which can be defined simply as a sorting pattern converter can again be implemented, as possible alternative, as a look-up table.

Figure 5:
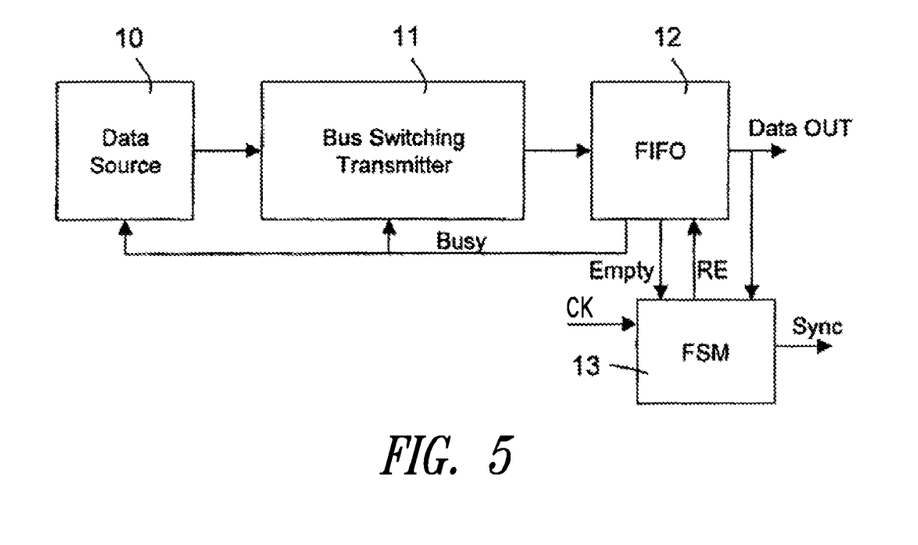
FIGS. 5 and 6 are block diagrams that illustrate the working principle of a first embodiment of the present invention.
Figure 6:
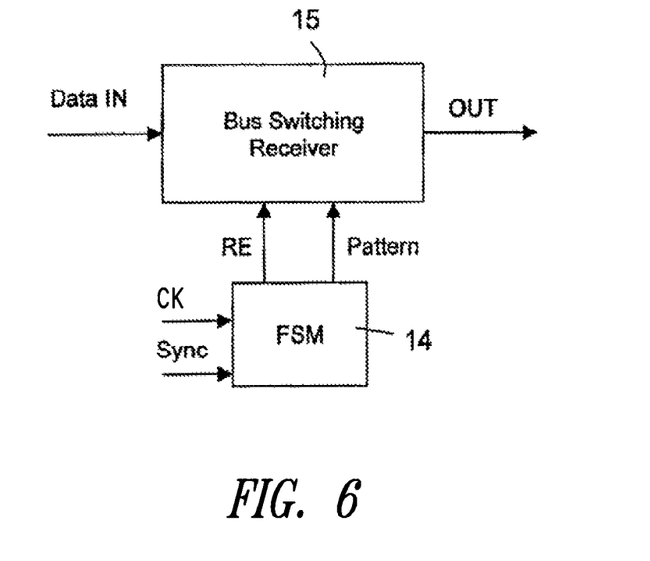

FIGS. 5 and 6 illustrate the circuit architecture, at the transmission end and at the reception end, with which synchronization of the sorting pattern is obtained according to a first embodiment of the present invention.

In particular, FIG. 5 illustrates a data source 10, consisting for example of a digital processor, which supplies the data to be transmitted on the bus 2; a transmitter 11 having the function of encoding the data supplied by the data source 10 in the way previously described so as to reduce the bus switching activity; a FIFO (First In First Out) register 12 having the purpose of accumulating the data supplied by the transmitter 11 before their introduction onto the bus 2, for the reasons that will be clarified in what follows; and a finite state machine 13 having the purpose of generating the aforementioned synchronization signal through which the sorting pattern is transmitted.

In particular, transmitter 11 receives the data generated by the data source 10 and supplies said data encoded in the way described above, together with the corresponding sorting patterns, which are supplied to the FIFO register 12, which accumulates them progressively before their introduction onto the bus 2.

Data accumulated in the FIFO register 12 are sent onto the bus 2 one at a time upon command of a read enable logic signal RE generated by the finite state machine 13 on the basis of the data and of the corresponding sorting patterns supplied thereto.

In particular, the finite state machine 13 has a number of internal states equal to the number of possible sorting patterns, and each of its internal states is uniquely associated to a respective sorting pattern. The finite state machine 13 compares each sorting pattern that it receives from the transmitter 11 with its own internal state and, when these coincide, generates the aforementioned logic synchronization signal Sync, which is supplied to the receiver via a respective additional line of the bus, and through which the receiver recovers the sorting pattern used in transmission.

Upon detection of the coincidence between the sorting pattern to be transmitted and its own internal state, the finite state machine 13 generates the aforesaid read enable signal RE that controls the FIFO register 12 so as to extract from this a new datum and enter it on the bus.

In addition to this, the FIFO register 12 generates a logic empty register signal Empty, indicating the fact that the FIFO register 12 does not contain data to be transmitted, and a logic transmission disabling signal Busy, indicating the fact that the FIFO register 12 is full and is hence no longer capable of accepting input data.

The empty register signal Empty is supplied to the finite state machine 13 with the purpose of interrupting the generation of the synchronization signal Sync when the FIFO register 12 is empty, whilst the transmission disabling signal Busy is supplied both to the data source 10 and to the transmitter 11 for interrupting generation of new data to be transmitted and consequently interrupting supply of new data to the input of the FIFO register 12.

As regards, instead, the circuit architecture at the reception end, FIG. 6 illustrates a finite state machine 14 having the function of recovering the sorting pattern used in transmission, and a receiver 15 having the purpose of decoding the data transmitted using the recovered sorting pattern.

In particular, the finite state machine 14 receives the synchronization signal Sync transmitted on the additional line of the bus and the empty register signal Empty and supplies the sorting pattern used in transmission and the read enable signal RE.

In particular, in a way similar to the finite state machine 13, the finite state machine 14 has a number of internal states equal to the number of possible sorting patterns, and each of its internal states is uniquely associated to a respective sorting pattern. In particular, the association between internal state and sorting pattern is exactly identical to that of the finite state machine 13.

In addition, the finite state machine 14 is synchronized with the finite state machine 13, i.e., the internal states of the two finite state machines 13 and 14 coincide at each instant of time.

Thanks to the synchronization and to the identity of association between internal states and sorting patterns of the two finite state machines 13, 14, at the moment of switching of the synchronization signal Sync the finite state machine 14 determines the sorting pattern associated to its internal state at that precise instant in time, a pattern that is exactly identical to the one transmitted.

The synchronization between the two finite state machines is guaranteed by supplying to both the same clock signal CK.

The receiver receives the data transmitted, the sorting pattern recovered, and the read enable signal RE, and supplies the data transmitted. In particular, the data transmitted are received, decoded using the sorting pattern recovered, and then supplied on the output of the receiver only after appropriate enabling provided by the read enable signal RE, which is generated locally by the finite state machine 14.

As mentioned previously, the finite state machines 13 and 14 are designed so as to have a number of internal states equal to the number of possible sorting patterns, and the evolution from one state to the next occurs with a frequency that is determined as a function of the frequency with which the data are sent onto the bus, taking into account the considerations that emerge from what follows.

In the first place, the clock frequency at which the finite state machine 13 operates internally cannot be too high with respect to the one at which the data are introduced onto the bus in so far as such a high frequency is not physically available in the chip in which said architecture is made, and cannot be too low in so far as the time spent for transmitting the data would be unacceptably long.

In particular, if we define $f_{FSM}=f_{bus} \cdot M$, where $f_{FSM}$ represents the clock frequency of the finite state machine 13, $f_{bus}$ represents the clock frequency of the bus, and M represents the number of attempts that are made in one bus cycle for identifying the sorting pattern, the bus cycle being defined as the interval of time elapsing between two successive introductions of data on the bus, and if after each recognition of a sorting pattern the finite state machine 13 is brought into the initial reset state, then the maximum time spent for identification of a sorting pattern is equal to N/M bus cycles.

The fact that the identification of the optimal sorting pattern of a datum involves N/M bus cycles leads to an inevitable delay in transmission of the datum on the bus, so that, in order not to have to interrupt the data source 10 and the transmitter 11, the FIFO register 12 is used, which accumulates the data as these are supplied by the transmitter 11 and enters them one by one on the bus once the corresponding sorting pattern has been identified.

This means that the drastic reduction to one of the transmission lines on which the sorting patterns are transmitted may be obtained only at the expense of a delay in transmission introduced by the FIFO register 12.

The FIFO register 12 is physically unable to have an infinite storage capacity, so that it is necessary to take into account also the likelihood of inoperativeness. Consequently, when the FIFO register 12 is full, the transmission disabling signal Busy is generated, which interrupts precisely the transmission of the data.

Consequently, the technique according to the invention is particularly advantageous and presents good performance in the case where the transmission on the bus is of the burst type (for example AMBA BUS and PCI BUS) and the FIFO register is sized according to the width of the burst.

Simulations conducted by the present applicant have demonstrated that in order to manage the probability of inoperativeness efficiently, the FIFO register 12 may conveniently be built using a process of birth and death of a Markov chain, which precisely makes it possible to determine a prior the probability of inoperativeness of the FIFO register 12 on the basis of the statistical information corresponding to the traffic.

Furthermore, in order to reduce the switching activity on the additional line of the bus through which the synchronization signal Sync containing the information regarding the sorting pattern used in transmission is supplied to the receiver, the coincidence between the internal state of the finite state machine 13 and the sorting pattern to be transmitted, which is supplied by the transmitter 11, is signalled to the finite state machine 14 at the reception end by complementing the synchronization signal Sync, which involves a single switching on the bus (single switching edge of the signal).

In addition, the finite state machines 13, 14 can go into the initial reset state either cyclically, after assuming all the possible internal states, or else after each recognition of a sorting pattern. In particular, the resetting of the finite state machines 13, 14, which can be achieved using precisely the synchronization signal Sync, which, as has been said, is complemented after each recognition of a sorting pattern, enables a further reduction in the transmission delay and is particularly advantageous in the case where the most probable sorting patterns, determined by a preventive analysis of the traffic, are associated to the first internal states of the finite state machines 13, 14.

Figure 7A:
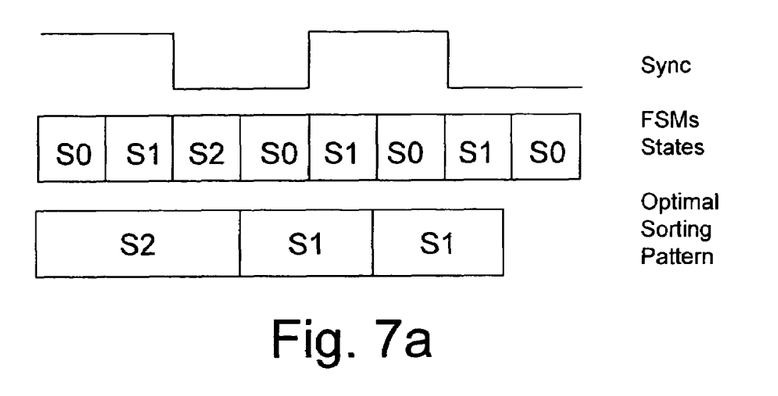
FIGS. 7a and 7b illustrate, in a comparative manner, quantities corresponding to the first embodiment of the present invention.
Figure 7B:
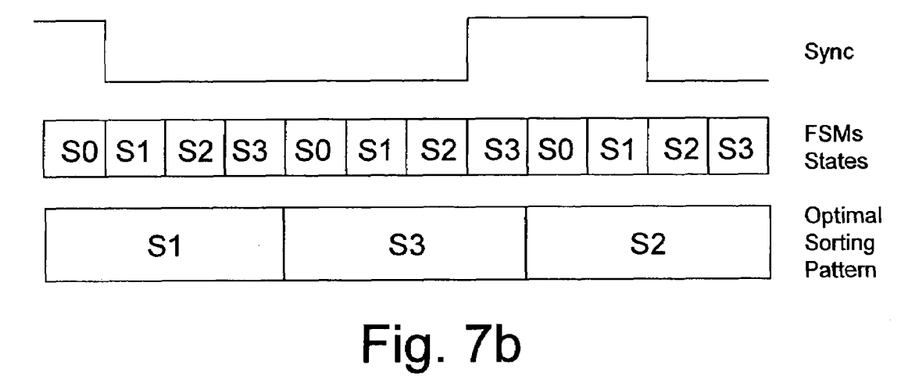

The reduction of the transmission delay that can be obtained by resetting the finite state machines 13, 14 after each recognition of a sorting pattern is highlighted in FIGS. 7a and 7b, which show the synchronization signal Sync, the internal states of the finite state machines 13, 14 (considering finite state machines with four internal states S0, S1, S2 and S3), and the optimal sorting pattern transmitted when the finite state machines 13, 14 go into the initial reset state after assuming all the possible internal states (FIG. 7a) and, respectively, when the finite state machines 13, 14 go into the initial reset state after each recognition of a sorting pattern (FIG. 7b).

From a comparative analysis of the two figures, it is possible immediately to note how, given the same clock cycles, the number of transitions of the synchronization signal is greater when resetting of the finite state machines occurs automatically after each recognition of a sorting pattern as compared to when the resetting of the finite state machines occurs after these have assumed all the possible internal states, said greater number of transitions of the synchronization signal Sync being an index of faster transmission.

Figure 8:
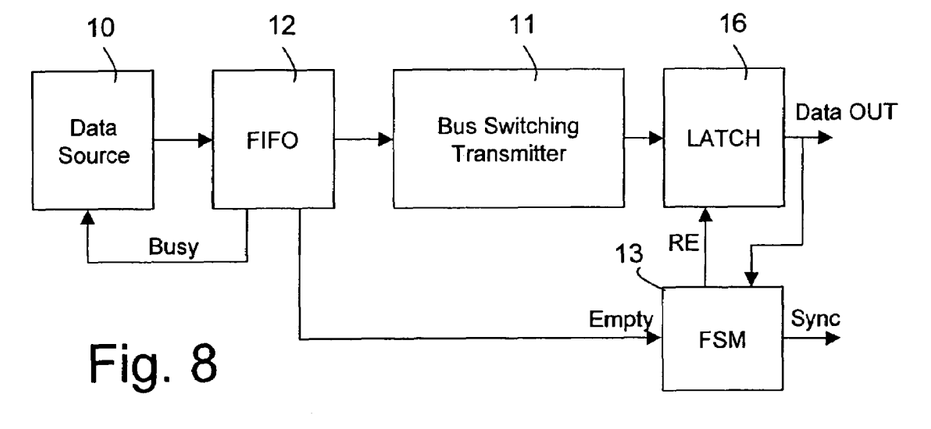
FIG. 8 is a block diagram that illustrates a possible variant of the first embodiment of the present invention at the transmission end.

FIG. 8 illustrates a possible variant of the circuit architecture, at the transmission end, illustrated in FIG. 5.

In particular, unlike what is illustrated in FIG. 5, where the FIFO register 12 is arranged downstream of the transmitter 11 and stores temporarily both the data supplied by the transmitter 11 and the sorting patterns associated thereto, according to the variant illustrated in FIG. 8 the FIFO register 12 is arranged between the data source 10 and the transmitter 11 and stores the data supplied by the data source 10.

In this way, since it is no longer necessary to store the sorting patterns, the FIFO register 12 has a storage capacity considerably smaller than the one present in the embodiment of FIG. 5, with consequent reduction in area occupied on the silicon.

This variant requires however, that there be synchronization between the data and the sorting patterns transmitted by the transmitter and the generation of the synchronization signal Sync by the finite state machine 13 so as to enable a correct recognition of the data transmitted at the reception end.

This may be obtained in two ways: either envisaging, as illustrated in FIG. 8, an output latch 16 arranged downstream of the transmitter 11, which is loaded with the datum to be transmitted and the corresponding sorting pattern only when the internal state of the finite state machine 13 coincides with the sorting pattern to be transmitted; or else setting the transmitter 11 in stand-by until the internal state of the finite state machine 13 coincides with the sorting pattern to be transmitted.

In the embodiment illustrated in FIG. 8, loading of the latch is enabled directly by the finite state machine 13 through the read enable signal RE that is generated by the latter when its internal state coincides with the sorting pattern to be transmitted, whilst in the other embodiment, not illustrated in FIG. 8, the transmitter 11 is set in stand-by by the finite state machine 13 until the internal state of the latter coincides with the sorting pattern to be transmitted.

Also in this embodiment, moreover, the FIFO register 12 generates at output the empty register logic signal Empty for the finite state machine 13, which indicates the fact that the FIFO register 12 does not contain data to be transmitted, and the transmission disabling logic signal Busy for the data source 10, which indicates the fact that the FIFO register 12 is full and is thus no longer able to accept input data.

Figure 9:
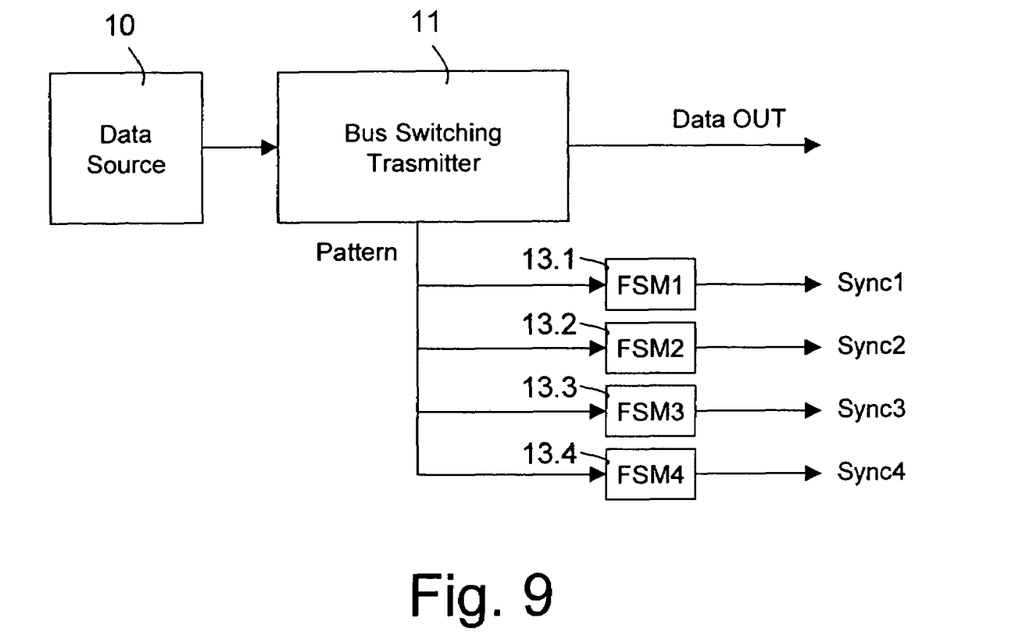
FIGS. 9 and 10 are block diagrams that illustrate the working principle of a second embodiment of the present invention.
Figure 10:
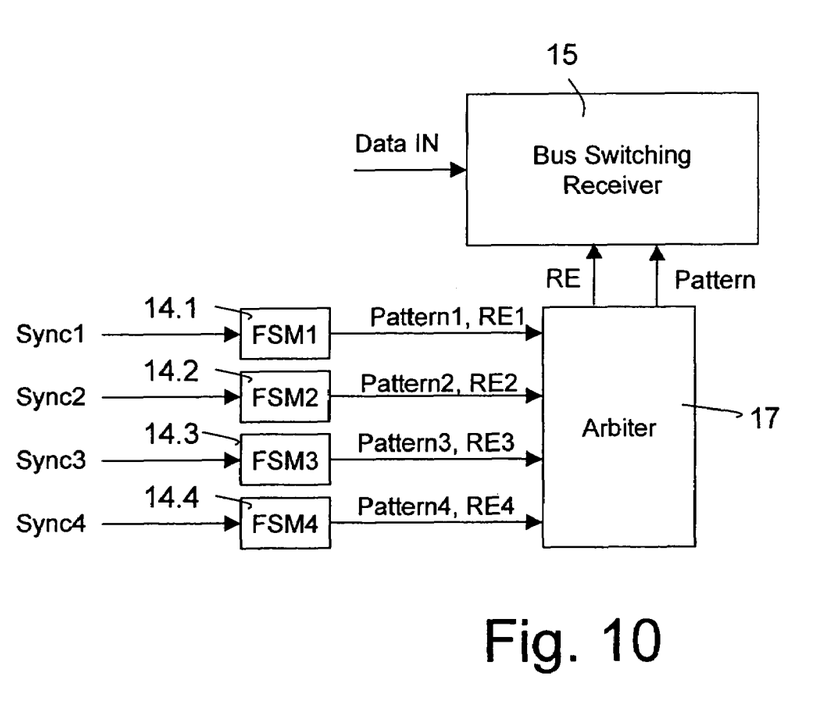

FIGS. 9 and 10 illustrate the circuit architecture, at the transmission end and at the reception end, with which synchronization of the sorting pattern is obtained according to a second embodiment of the present invention, which is particularly advantageous when there are additional transmission lines on the bus that are freely usable.

In particular, unlike the first embodiment of the present invention previously described with reference to FIGS. 5 and 6, the second embodiment does not entail the use of a FIFO register in transmission, and its elimination is made possible by the adoption of a parallel architecture that exploits said additional free transmission lines in combination with the use of different sorting patterns.

In particular, according to what is illustrated in FIG. 9, where parts that are identical to the ones appearing in FIG. 5 are identified with the same reference numbers, instead of the FIFO register 12, N/M finite state machines are used, in which N and M have the meanings indicated above, i.e., N is the number of possible sorting patterns and M is the number of times that the clock frequency of each finite state machine 13 is higher than the clock frequency of the bus.

The finite state machines receive the sorting pattern supplied by the transmitter 11, and each of them supplies a corresponding synchronization signal, designated by Sync1, Sync2, Sync3 and Sync4, which is sent to the reception end through a corresponding additional line of the bus.

Furthermore, the finite state machines have the same number of internal states smaller than the number N of possible sorting patterns, and associated to the internal states of each finite state machine is a subset of the possible sorting patterns that are distinct and disjoint with respect to the subsets associated to the other finite state machines; i.e., the subsets of the possible sorting patterns of the finite state machines do not contain elements in common.

For convenience of illustration and description, FIG. 9 illustrates, by way of non-limiting example, the case where the number of possible sorting patterns is N=16 and the finite state machines work at a clock frequency four times greater than the clock frequency of the bus, i.e., M=4, it remaining understood that what has been said as regards this specific example is of altogether general application.

The finite state machines necessary for implementing the second embodiment are consequently four (N/M=4), which are designated in FIG. 8 by 13.1, 13.2, 13.3. and 13.4, and the corresponding synchronization signals by Sync1, Sync2, Sync3 and Sync4.

Each of the four finite state machines 13.1-13.4 has a number of internal states equal to four, and associated to the four internal states of each finite state machine are four of the possible sorting patterns. Furthermore, the four subsets of sorting patterns associated to the internal states of the four finite state machines 13.1-13.4 do not contain elements in common.

In this way, when the transmitter 11 supplies the datum to be transmitted together with the corresponding sorting pattern, each of the four finite state machines 13.1-13.4 compares the sorting pattern received with its own internal state, and given that the clock frequency of the finite state machines 13.1-13.4 is four times higher than the clock frequency of the bus, at the end of one bus cycle the sorting pattern to be transmitted will have been recognized, i.e., the internal state of one of the finite state machines 13.1-13.4 will certainly coincide with the sorting pattern to be transmitted.

Upon detection of the coincidence between the sorting pattern to be transmitted and its own internal state, the finite state machine 13.1-13.4 in question generates the corresponding synchronization signal Sync1-Sync4 that is sent to the reception end.

Furthermore, the finite state machines 13.1-13.4 can go into the initial reset state, either cyclically after assuming all the possible internal states or else after each recognition of a sorting pattern. In order to ensure that all the finite state machines 13.1-13.4 go into the initial reset state after each recognition of a sorting pattern, the synchronization signal Sync1-Sync4 generated by a finite state machine 13.1-13.4 is supplied also to all the other finite state machines 13.1-13.4, which are reset upon detection of the switching of any one of the synchronization signals Sync1-Sync4.

As regards the reception end, as illustrated in FIG. 10, in which parts that are identical to the ones appearing in FIG. 6 are identified with the same reference numbers, there are present N/M finite state machines, each of which receives at input a corresponding synchronization signal Sync and supplies at output a corresponding sorting pattern and a corresponding read enable signal RE, and an arbiter which receives the sorting patterns and the read enable signals RE generated by the finite state machines and which supplies to the receiver the sorting pattern and the read enable signal RE generated by the finite state machine involved in the recognition of the sorting pattern.

Furthermore, the finite state machines at the reception end are functionally identical to the finite state machines at the transmission end; i.e., they have the same number of internal states as the finite state machines at the transmission end, and associated to each one of them is the same subset of sorting patterns that is associated to the finite state machine at the transmission end, from which it receives the synchronization signal.

With reference to the example illustrated in FIG. 9, the four finite state machines at the reception end are designated respectively by 14.1, 14.2, 14.3 and 14.4, the sorting patterns supplied by the latter are respectively designated by Pattern1, Pattern2, Pattern3 and Pattern4, the read enable signals generated by them are respectively designated by RE1, RE2, RE3 and RE4, and the arbiter is designated by 17.

When one of the four finite state machines 14.1-14.4 verifies that switching of the corresponding synchronization signal Sync1-Sync4 has occurred, it recovers the sorting pattern transmitted in the bus cycle in which said switching has occurred and generates the sorting pattern transmitted and the corresponding read enable signal, which, via the arbiter 17, are supplied to the receiver 15, which uses them for decoding the data transmitted.

Also in this case the finite state machines 14.1-14.4 can go into the initial reset state either cyclically after assuming all the possible internal states or else after each recognition of a sorting pattern. To ensure that all the finite state machines 14.1-14.4 go into the initial reset state after each recognition of a sorting pattern, each of the finite state machines 14.1-14.4 at the reception end receives all the synchronization signals generated by the finite state machines 13.1-13.4 at the transmission end so as to reset itself upon detection of switching of any one of the synchronization signals.

In particular, for this purpose each finite state machine 14.1-14.4 observes the following rules:

if its own synchronization signal switches, the sorting pattern is recognized, its own read enable signal goes to the high logic state, and the finite state machine goes into the reset state;

if one of the other synchronization signals switches, its own read enable signal goes to the low logic state, and the finite state machine goes into the reset state; and if no synchronization signal switches, the finite state machine goes into the next internal state.

It is further deemed useful to point out that, with the architecture according to the second embodiment of the present invention (illustrated in FIGS. 9 and 10), the switching activity of the additional lines of the bus used for transmitting the synchronization signals is equal to the one that exists in the architecture according to the first embodiment of the present invention (illustrated in FIGS. 5 and 6) and in the corresponding variant (illustrated in FIG. 8), in which just one finite state machine is used at the transmission end, and a corresponding finite state machine is used at the reception end in so far as in the second embodiment just one of the finite state machines at the transmission end recognizes the sorting pattern and generates the corresponding synchronization signal in each bus cycle.

The following table sums up the improvement that the present invention makes available in terms of reduction of switching activity SA as compared to the known art in a specific case of transmission, on a bus with thirty lines and with a cluster depth equal to six, of files of a different type (Latex, Spice, GCC, JPEG, MP3 and AVI).

| Type of file | Classic technique | New technique |
|---|---|---|
| LaTeX | 26.48% | 37.4% |
| Spice | 25.84% | 36.59% |
| Gcc | 25.96% | 36.40% |
| Jpeg | 15.92% | 27.03% |
| Mp3 | 15.53% | 27.06% |
| Avi | 35.00% | 36.06% |

From an a examination of the characteristics of the present invention the advantages that it makes possible are evident.

In particular, it makes it possible to reduce to one the number of the additional transmission lines necessary for transmitting the sorting patterns, with a consequent drastic reduction in the bus switching activity of up to 35% with respect to a non-encoded transmission.

Furthermore, as has been said at the beginning of the present description and as will immediately emerge clearly to the reader from the foregoing description, the inventive idea underlying the present invention is of altogether general application and can be used for transmitting data of any nature on a single line.

In fact, to transmit an n-bit datum it is sufficient to generate in succession all the possible combinations of n bits, compare the n-bit datum to be transmitted with the combinations of n bits generated, generate an identity signal upon detection of the coincidence between the n-bit datum to be transmitted and one of the combinations of n bits generated, and transmit the coincidence signal on the single line.

In reception, instead, it is necessary to generate the same succession of combinations of n bits generated in transmission, since the successions of combinations of n bits generated in transmission and in reception have to be synchronized with one another, and identify the combination of n bits generated at the instant of reception of the identity signal transmitted on the single line, the combination of n bits generated at the instant of reception of the identity signal being nothing other than the datum to be transmitted.

It will moreover be appreciated that the present invention is suitable for being implemented to particular advantage in the form of a computer product that can be loaded into a memory (typically a set of registers) of a processor associated to the bus and that comprises portions of software code which, when the computer product is run on the aforesaid processor, perform the steps of the methods according to the invention.

Finally, it is clear that modifications and variations can be made to what has been described and illustrated herein, without thereby departing from the sphere of protection of the present invention, as defined in the attached claims.

The invention claimed is:

1. A method for transmitting data on a bus with minimization of bus switching activity, the method comprising:
    converting a datum to be transmitted from its own original format into a transmission format that reduces the bus switching activity, said converting including: swapping a position of one or more bits of the datum to be transmitted, said swapping being performable according to a plurality of different variants, each of which is identified by a respective sorting pattern; and selecting, between the sorting patterns, a particular sorting pattern that reduces the bus switching activity upon transmission on the bus of the datum generated using said selected sorting pattern, said selected sorting pattern compressed to $M \cdot \log_2 M$ bits, where M is a number of lines in the bus;
    transmitting on at least one line of the bus the datum in said transmission format, and transmitting on one additional line of the bus a synchronization signal having the selected sorting pattern;
    receiving the datum in said transmission format, and receiving the synchronization signal having the selected sorting pattern transmitted on the bus; and
    converting the datum received from said transmission format to said original format using the selected sorting pattern received, which is decompressed from the $M \cdot \log_2 M$ bits,
    wherein a succession of said sorting patterns generated at a transmission end and a succession of sorting patterns generated at a reception end are synchronized with each using a same clock signal supplied to said transmission and reception ends.

2. The method according to claim 1 wherein said transmitting on the bus the selected sorting pattern includes:
    generating said succession of sorting patterns identifying all possible swaps of the position of the bit or bits of the datum to be transmitted;
    comparing the particular sorting pattern to be transmitted with the sorting patterns generated; and
    generating and transmitting on the bus said synchronization signal upon detection of a coincidence between the particular sorting pattern to be transmitted and one of the sorting patterns generated.

3. The method according to claim 2 wherein said receiving the selected sorting pattern transmitted on the bus includes:
    generating said succession of sorting patterns identical to, and synchronous with, the generated succession of sorting patterns identifying all possible swaps of the position of the bit or bits of the datum to be transmitted; and
    identifying one of the succession of sorting patterns that is generated at an instant of reception of the synchronization signal transmitted on the bus, the sorting pattern identified being identical to said selected sorting pattern to be transmitted.

4. The method according to claim 3 wherein the sorting pattern selected reduces the bus switching activity to a minimum amount.

5. The method according to claim 2 wherein said generating the succession of sorting patterns includes:
    providing a finite state machine having a number of internal states equal to a number of possible swaps of the position of the bit or bits of the datum to be transmitted;
    associating to each of the internal states of said finite state machine a respective sorting pattern; and
    operating said finite state machine at a given frequency so as to cause its internal state to evolve and generate said sorting patterns,
    wherein said same clock signal supplied to said transmission and reception ends is respectively supplied to said finite state machine and to another finite state machine at said reception end.

6. The method according to claim 2 wherein said generating the succession of sorting patterns includes:
    generating a plurality of disjoint sets of sorting patterns, each set being formed by a sorting pattern identifying a respective subset of possible swaps of the position of the bit or bits of the datum to be transmitted, the sorting patterns of each set being further generated in succession and in a synchronous way with respect to the sorting patterns of the other sets.

7. The method according to claim 6 wherein the generating the plurality of separate sets of sorting patterns includes, for each said set of sorting patterns:
- providing a finite state machine having a number of internal states equal to a number of sorting patterns in the set;
- associating to each of the internal states of said finite state machine a respective sorting pattern; and
- operating said finite state machine at a given frequency so as to cause its internal state to evolve and generate the corresponding sorting patterns,
- wherein said same clock signal supplied to said transmission and reception ends is respectively supplied to said finite state machine and to another finite state machine at said reception end.

8. A system for transmitting data on a bus with minimization of bus switching activity, the device comprising:
- first converting means for converting a datum to be transmitted from its own original format to a transmission format that minimizes the bus switching activity, said first converter means including:
  - a swap operator for swapping a position of one or more bits of the datum to be transmitted, said swapping being performable according to a plurality of different variants, each of which is identified by a respective sorting pattern; and
  - selecting means for selecting, between the various sorting patterns, an optimal sorting pattern that minimizes the bus switching activity upon transmission on the bus of the datum generated using said optimal sorting pattern;
- a compression module that compresses said selected optimal pattern to $M \cdot \log_2 M$ bits, where M is a number of lines in the bus;
- transmitting means for transmitting on at least one line of the bus the datum in said transmission format and on one additional line of the bus a synchronization signal having the optimal sorting pattern;
- receiving means for receiving the datum in said transmission format and said optimal sorting pattern transmitted on the bus, the receiving means including a decompression module to decompress the optimal sorting pattern; and
- second converting means for converting the datum received from said transmission format to said original format using said optimal sorting pattern received,
- wherein said transmitting means includes:
  - first sorting pattern generating means for generating a succession of sorting patterns identifying all possible swaps of the position of the bit or bits of the datum to be transmitted;
  - comparing means for comparing the optimal sorting pattern to be transmitted with the sorting patterns generated;
  - signal generating means for generating and sending onto said additional line of said bus said synchronization signal upon detection of an identity between the optimal sorting pattern to be transmitted and one of the sorting patterns generated,
- wherein said receiving means includes:
  - second sorting pattern generating means for generating a succession of sorting patterns identical to, and synchronous with, the sorting patterns generated by said first sorting pattern generating means; and
  - detecting means for identifying one of the sorting patterns generated by said second sorting pattern generating means at an instant of reception of the synchronization signal transmitted on the bus, the sorting pattern identified being identical to said optimal sorting pattern to be transmitted,
- wherein said succession of said sorting patterns generated at transmission and said succession of sorting patterns generated at reception are synchronized with each other using a same clock signal supplied to said transmitting means and to said receiving means.

9. The system according to claim 8 wherein said first and second sorting pattern generating means each include a finite state machine, supplied with said same clock signal, having a number of internal states equal to a number of possible swaps of the position of the bit or bits of the datum to be transmitted, a respective sorting pattern being associated to each of the internal states of said finite state machine, said finite state machine being operated at a given frequency so as to cause its internal state to evolve and generate said sorting patterns.

10. The system according to claim 8 wherein said first and second sorting pattern generating means each include a plurality of sorting pattern modules generating a plurality of disjoint sets of sorting patterns, each set being formed by a sorting pattern identifying a respective subset of all the possible swaps of the position of the bit or bits of the datum to be transmitted, the sorting patterns of each set being further generated in succession and in a synchronous way with respect to the sorting patterns of other sets.

11. The system according to claim 10 wherein each of said sorting pattern generating modules includes a finite state machine, supplied with said same clock signal, having a number of internal states equal to a number of sorting patterns of the corresponding set, a respective sorting pattern being associated to each of the internal states of said finite state machine, said finite state machine being operated at a given frequency so as to cause its internal state to evolve and generate said sorting patterns.

12. A computer readable medium comprising a memory associated with a bus, the memory is loaded with a computer product, said computer product having portions of software code that are executable by a processor to minimize bus switching activity, by:
- converting a datum to be transmitted from its own original format into a transmission format that reduces the bus switching activity, said converting including: swapping a position of one or more bits of the datum to be transmitted, said swapping being performable according to a plurality of different variants, each of which is identified by a respective sorting pattern; and selecting, between the sorting patterns, a particular sorting pattern that reduces the bus switching activity upon transmission on the bus of the datum generated using said selected sorting pattern, and compressing said selected sorting pattern to $M \cdot \log_2 M$ bits, where M is a number of lines in the bus;
- transmitting on at least one line of the bus the datum in said transmission format; and
- transmitting on one additional line of the bus a synchronization signal having said selected sorting pattern and usable by a receiving device to identify said selected sorting pattern from a plurality of sorting patterns, which is decompressed from the $M \cdot \log_2 M$ bits,
- wherein a succession of said sorting patterns generated at a transmission end and a succession of sorting patterns generated at a reception end are synchronized with each using a same clock signal supplied to said transmission and reception ends.

13. A method for communicating n-bit data on a single line, comprising:

in transmission:
generating in succession all possible combinations of n bits;
comparing an n-bit datum to be transmitted with the combinations of n bits generated; and
generating and transmitting an identity signal, upon detection of a coincidence between the n-bit datum to be transmitted and one of the combinations of n bits generated in accordance with a selected sorting pattern, compressing said selected sorting pattern to $M \cdot \log_2 M$ bits, where M is a number of lines in the bus, and further generating and transmitting on the single line at least one signal that transmits said data; and in reception:
generating a succession of combinations of n bits identical and synchronous to the combinations generated in succession in transmission; and
identifying one of the combination of n bits generated at an instant of reception of the identity signal in accordance with the selected sorting pattern, which is decompressed from the $M \cdot \log_2 M$ bits, the combination of n bits identified corresponding to the n-bit datum to be transmitted, wherein said succession of combinations generated at transmission and said succession of combinations generated at reception are synchronized with each other using a same clock signal supplied at said transmission and at said reception.

14. The method according to claim 13 wherein said generating in succession all the possible combinations of n bits in said transmission and in said reception includes:
providing a finite state machine, supplied with said same clock signal, having a number of internal states equal to a number of possible combinations of n bits;
associating to each of the internal states of said finite state machine a respective combination of n bits; and
operating said finite state machine at a given frequency so as to cause its internal state to evolve and generate the corresponding combinations of n bits.

15. The method according to claim 13 wherein said generating the combinations of n bits in said transmission and in said reception includes:
generating a plurality of disjoint sets of possible combinations of n bits, the combinations of n bits of each set being further generated in succession and in a synchronous way with respect to the combinations of n bits of the other sets.

16. The method according to claim 15 wherein the generating a plurality of disjoint sets of possible combinations of n bits in said transmission and in said reception includes, for each said set of combinations of n bits:
providing a finite state machine, supplied with said same clock signal, having a number of internal states equal to a number of combinations of n bits in the set;
associating to each of the internal states of said finite state machine a respective combination of n bits; and
operating said finite state machine at a given frequency so as to cause its internal state to evolve and generate the corresponding combinations of n bits.

17. A computer product loadable into a memory, said computer product including portions of software code that can implement the method according to claim 13 when the computer product is executed by a digital processor associated to the bus.

18. A system for transmitting n-bit data on a single line in a bus, comprising:

at a transmission end:
first combination generating means for generating in succession all possible combinations of n bits;
comparing means for comparing an n-bit datum to be transmitted with the combinations of n bits generated; and
signal generating means for generating and transmitting on said single line an identity signal, upon detection of a coincidence between the n-bit datum to be transmitted and one of the combinations of n bits generated in accordance with a sorting pattern, said signal generating means further generating and transmitting on the single line at least one signal that transmits said data, a compression module that compresses said sorting pattern to $M \cdot \log_2 M$ bits, where M is a number of lines in the bus; and at a reception end:
second combination generating means for generating a same succession of combinations of n bits as that generated by the first combination generating means, the successions of combinations of n bits generated by the said first and second combination-generating means being synchronized with one another; and
detecting means for identifying one of the combination of n bits generated by said second combination generating means at an instant of reception of the identity signal transmitted, the combination of n bits identified corresponding to the n-bit datum to be transmitted, wherein said succession of combinations generated at said transmission end and said succession of combinations generated at said reception end are synchronized with each other using a same clock signal supplied to said transmission end and to said reception end.

19. The system according to claim 18 wherein each of said first and second combination generating means include a finite state machine, supplied with said same clock signal, having a number of internal states equal to a number of possible combinations of n bits, a respective combination of n bits being associated to each of the internal states of said finite state machine, and said finite state machine being operated at a given frequency so as to cause its internal state to evolve and generate the corresponding combinations of n bits.

20. The system according to claim 18 wherein said first and second combination generating means each include a plurality of combination generating modules generating a plurality of disjoint sets of possible combinations of n bits, the combinations of n bits of each set being generated in succession and in a synchronous way with respect to the combinations of n bits of the other sets.

21. The system according to claim 20 wherein each of said combination generating modules includes a finite state machine, supplied with said same clock signal, having a number of internal states equal to a number of combinations of n bits in the set, a respective combination of n bits being associated to each of the internal states of said finite state machine, and said finite state machine being operated at a given frequency so as to cause its internal state to evolve and generate the corresponding combinations of n bits.

22. A transmitter device coupled to a bus, comprising:
a converter to convert a datum to be transmitted, on at least one line of the bus, from an initial format to a transmission format, said transmission format being a selected sorting pattern from among a succession of sorting patterns that identify possible swaps of bit positions of said datum; and a first finite state machine having a number of internal states equal to a number of said sorting patterns and each of said internal states respectively corresponding to one of said sorting patterns;

wherein said first finite state machine is adapted to be supplied with a clock signal to synchronize each internal state of said first finite state machine with a respective same internal state of a second finite state machine, at a receiving end, that is also supplied with same said clock signal and that receives said datum in said transmission format and that also has a number of internal states equal to said number of said sorting patterns and each of said internal states of said second finite state machine at the receiving end also respectively corresponding to one of said sorting patterns, a compression module that compresses said corresponding sorting pattern to $M \cdot \log_2 M$ bits, where M is a number of lines in the bus, wherein said first finite state machine is adapted to generate a synchronization signal sent on one additional line of said bus to be received by said second state machine, said synchronization signal corresponding to a particular one of said internal states of said first finite state machine that corresponds to said selected sorting pattern used in transmission of said datum and said synchronization signal being adapted to be used by said second finite state machine to identify said selected sorting pattern including a decompression module that decompresses the optimal sorting pattern from a particular one of said internal states of said second state machine that is synchronized by said clock signal with said particular internal state of said first finite state machine.

23. The device of claim 22, further comprising a register to store said sorting patterns.

24. The device of claim 22 wherein said sorting patterns are from among a plurality of disjoint sets of sorting patterns.

* * * * *

UNITED STATES PATENT AND TRADEMARK OFFICE
CERTIFICATE OF CORRECTION

PATENT NO. : 7,586,943 B2  Page 1 of 1
APPLICATION NO. : 10/757772
DATED : September 8, 2009
INVENTOR(S) : Pappalardo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Twenty-first Day of September, 2010

David J. Kappos
*Director of the United States Patent and Trademark Office*